United States Patent Office 3,687,810
Patented Aug. 29, 1972

3,687,810
PROCESS FOR PRODUCING L-LYSINE BY FERMENTATION
Sumio Kurihara, Hofu-shi, Yamaguchi-ken, Kazumi Araki, Machida-shi, Tokyo-to, and Katsumi Akeyama and Yoshimasa Takasawa, Hofu-shi, Yamaguchi-ken, Japan, assignors to Kyowa Hakko Kogyo Kabushiki Kaisha, Tokyo, Japan
No Drawing. Filed June 8, 1970, Ser. No. 44,114
Claims priority, application Japan, June 9, 1969, 44/44,624
Int. Cl. C12d 1/00
U.S. Cl. 195—29                      6 Claims

ABSTRACT OF THE DISCLOSURE

The present invention relates to a process for producing L-lysine by fermentation using an L-lysine-producing strain of *Corynebacterium glutamicum* and *Brevibacterium flavum* capable of resisting antibiotics such as penicillin, bacitracin, cycloserine, gramicidin, polymixin and nystatin.

BACKGROUND OF INVENTION

It has been reported in Japanese patent publication No. 6,499/1961 that microbial mutant strains belonging to the genus Micrococcus, Bacillus, Escherichia and Aerobacter, etc. can be used as microorganisms capable of producing L-lysine by fermentation and that they require (1) homoserine, (2) threonine and methionine, (3) threonine and cystathionine, (4) threonine and homocysteine and/or homoserine and leucine for their growth. In addition, threonine-requiring microbial mutant strains belonging to genus Brevibacterium have been reported in French Pat. No. 1,533,688.

However, the L-lysine productivities of these known strains are not sufficient for commercial production. Moreover, when a crude saccharin material e.g., molasses, is used as a main source, a reproducible constant yield of L-lysine on sugar is not obtained. Yields depend upon the place and conditions of the molasses production which is quite undesirable from the viewpoint of maintaining controlled constant production.

An object of the present invention is to provide an improved process for producing L-lysine by fermentation which can be carried out on a commercial scale with high yield on sugar and better reproducibility in a culture medium.

After conducting extensive studies for the improvement of strains the present inventors have discovered that the production of L-lysine can be greatly increased when various antibiotics-resisting properties are imparted to known L-lysine-producing strains whereby the difficulties which are encountered by the use of molasses for fermentation can be eliminated.

The present invention based on such discovery is directed providing a process for producing L-lysine which involves the steps of culturing an L-lysine-producing mutant strain capable of resisting antibiotics in a nutrient medium, and recovering the accumulated L-lysine therefrom.

Japanese patent publication No. 4,398/1966 discloses a process using an antibiotic-resisting strain for glutamic acid fermentation. In this process an antibiotic corresponding to the resistant of the used strain is added to the culture medium whereby the growth of contaminated strains not having resistance to antibiotics can be inhibited to stabilize the glutamic acid fermentation.

In contrast, it is possible to advantageously carry out L-lysine fermentation according to the present invention with improved yields and without conventional difficulties arising from the use of molasses even when antibiotics are not added to the culture medium.

SUMMARY OF INVENTION

L-lysine-producing mutant strains capable of resisting antibiotic which may be used for the purpose of the present invention can be obtained in various conventional manners, and the degree of resistance of the mutants may vary with the treating concentration of antibiotic. A preferred method is exemplified in the following. A strain which has an excellent ability to produce L-lysine is selected from the known L-lysine-producing strains. The strain is treated by a conventional mutation-inducing method such as treatment with ultraviolet rays, X-ray, sodium nitrite and N-methyl-N'-nitro-N-nitrosoguanidine, etc.

The strains obtained are cultured in a known screening medium containing antibiotics at a suitable concentration (e.g., bouillon agar medium and minimum agar medium) whereby the strain which is resistant to the added antibiotics can be selectively recovered. In this case, it is possible to obtain a strain which is resistant to more than two types of antibiotics by cultivating the mutants in a medium containing more than two types of antibiotics or culturing the obtained strains in a screening medium containing other antibiotics. It is furthermore possible to obtain strains which show a higher resistance to antibiotics by selecting strains of low resistance to antibiotics and subjecting them to repetitive mutation-inducing treatments carried out in a similar manner to that described above.

Antibiotics capable of imparting the antibiotic resistance to strains according to the present invention can be exemplified by penicillin, bacitracin, cycloserine, gramicidin, polymixin and nystatin, etc., which resistance to antibiotics is capable of inhibiting the synthesis of cell walls of disordering function of cell membranes. Normal concentrations of the antibiotic in the screening medium range from 0.5 to 1000 γ/ml., preferably 1 to 200 γ/ml.

Examples of antibiotics-resisting strains obtained, according to the present invention, and degree of their resistance to antibiotics compared with their parent strains are shown in Table 1. These strains have been deposited with American Type Culture Collection before the filing of this application on an unrestricted basis.

B. Polymixin-resisting strains

| Strain | A | B | | |
|---|---|---|---|---|
| | | | C | D |
| *Corynebacterium glutamicum*, M-901-No. 2347- TA52 (ATCC 21516). | Polymixin B | 0 | 0.00 | 0.51 |
| | do | 0.4 | 0.00 | 0.32 |
| (Parent strain) *Corynebacterium glutamicum*, M-901-No. 2347- (ATCC 21253). | Polymixin B | 0 | 0.00 | 0.34 |
| | do | 0.4 | 0.00 | 0.00 |

Note.—A=Added antibotics and its amount (μ/ml.); B=Amount of microbial cell in broth (optical density); C=0 hour; D=After 7 hours.

TABLE 1

A. Penicillin-resisting strains

| Strain | | A | B | | | |
|---|---|---|---|---|---|---|
| | | | C | D | E | F |
| Corynebacterium glutamicum, 2347-TA18 (ATCC 21513). | M-901-No. | Penicillin G | 0 | 0.00 | 1.09 | |
| | | do | 0.4 | 0.00 | 0.13 | |
| Corynebacterium glutamicum, 2347-TA26 (ATCC 21514). | M-901-No. | Penicillin G | 0 | 0.00 | 1.30 | |
| | | do | 0.4 | 0.00 | 1.16 | |
| Corynebacterium glutamicum, 2347-TA27 (ATCC 21515). | M-901-No. | Penicillin G | 0 | 0.00 | 0.99 | |
| | | do | 0 | 0.00 | 0.14 | |
| (Parent strain) Corynebacterium glutamicum, M-901-No. 2347 (ATCC 21253). | | Penicillin G | 0 | 0.00 | 1.29 | 1.32 |
| | | do | 0.4 | 0.00 | 0.01 | 0.01 |
| Brevibacterium flavum, S-5-P$_s$27 (ATCC 21517). | | Penicillin G | 0 | 0.0 | | 1.5 |
| | | do | 0.2 | 0.0 | | 0.5 |
| (Parent strain) Brevibacterium flavum S-5 (ATCC 21127). | | Penicillin G | 0 | 0.0 | | 1.3 |
| | | do | 0.2 | 0.0 | | 0.0 |
| Brevibacterium flavum, ST-12-P$_s$25 (ATCC 21518). | | Penicillin G | 0 | 0.0 | | 1.6 |
| | | do | 0.2 | 0.0 | | 1.1 |
| (Parent strain) Brevibacterium flavum ST-12 ATCC (21128). | | Penicillin G | 0 | 0.0 | | 1.2 |
| | | do | 0.2 | 0.0 | | 0.0 |

NOTE.—A=Added antibiotics and its amount ($\mu$/ml.); B=Amount of microbial cell in broth (optical density); C=Just after addition; D=After 12 hours; E=After 17 hours; F=After 34 hours.

Note 1.—Medium composition: glucose 4 g./dl.; peptone 2 g./dl.; meat extract 0.5 g./dl.; urea 0.5 g./dl.; $KH_2PO_4$ 0.15 g./dl.; $K_2HPO_4$ 0.05 g./dl.; magnesium sulfate 0.05 g./dl.; and biotin 5 $\gamma$/dl.

Note 2.—Cultivating condition: 8 ml. of the medium is poured into an L-shaped test tube. After sterilization, 1 ml. of water (as control area) or solution containing antibiotics having a concentration ten times as much as described in the above table is added, to which 1 ml. of cell suspension containing $10^6$ cells/ml. is inoculated. Cultivating is carried out with shaking at a temperature of 28° C.

Note 3.—OD: measured at 660 m$\mu$.

Medium composition and cultivating condition for carrying out the process according to the present invention are essentially the same as those of known methods. Preferred carbon sources include, for example, various carbohydrates and organic acids such as glucose, sucrose, starch hydrolysate, molasses, and acetic acid, etc. In particular, the present invention can advantageously be carried out by using molasses. Preferable nitrogen sources include, for example, organic and inorganic nitrogen compounds such as ammonium sulfate, ammonium chloride, ammonium acetate and urea, etc. Preferable inorganic sources can be exemplified by inorganic salts such as potassium dihydrogen phosphate, potassium monohydrogen phosphate, magnesium sulfate, manganese sulfate, ferrous sulfate, and calcium carbonate, etc. As organic nutrients, natural organic nutrients such as vitamine, amino acids, nucleic acid bases, corn steep liquor, meat extract, yeast extract, peptone, soybean hydrolysate and microbial cell hydrolysate, etc. can be preferably used.

The cultivation is carried out under aerobic conditions at a temperature of about 24–37° C. at a pH of about 5–8.5. Generally, it is preferred to add the carbon source by the so-called feeding method. L-lysine is accumulated in the culture medium usually after 2–5 days.

The following non-limitative examples illustrate the present invention.

Example 1

20 ml. of a medium having a composition of glucose (4 g./dl.), $KH_2PO_4$ (0.05 g./dl.), $K_2HPO_4$ (0.15 g./dl.), urea (0.3 g./dl.), magnesium sulfate (0.05 g./dl.), peptone (2 g./dl.), meat extract (0.5 g./dl.) and biotin (5 $\gamma$/dl.) was placed in a 250 ml. Erlenmeyer flask, to which Corynebacterium glutamicum M-901-No. 2347-TA18 (ATCC 21513) which is penicillin-resisting mutant strain was inoculated and cultivated with shaking at a temperature of 28° C. for 24 hours to prepare a seed culture. The fermentation was carried out in such a manner that 10 ml. of a medium having a composition of molasses (15 g./dl.) (as glucose), magnesium sulfate (0.03 g./dl.), $KH_2PO_4$ (0.07 g./dl.), urea (0.3 g./dl.), soybean protein acid hydrolysate (2 g./dl.) and calcium carbonate (3 g./dl.) was placed in a 250 Erlenmeyer flask, and sterilized, to which 0.5 ml. of the above-described seed culture was inoculated. The cultivation was carried out at a temperature of 28° C. for 110 hours with shaking by the use of a rotary shaker. The amount of L-lysine in the fermentation liquor was 53.2 mg./ml., which corresponds to a yield of 35.5% to the consumed sugar. (The amount of L-lysine obtained when the cultivation was performed using the parent strain Corynebacterium glutamicum M-901-No. 2347 (ATCC 21253) in a similar manner to that described above was 43.9 mg./ml.)

Examples 2 and 3

The cultivation was carried out by using the strains shown in Table 2 in a similar manner to that described in Example 1. The results are as follows:

TABLE 2

| Example Number | Strain used | A (mg./ml.) | B (percent) |
|---|---|---|---|
| 2 | Corynebacterium glutamicum, M-901-No. 2347-TA26 (ATCC 21514).[1] | 50.3 | 33.5 |
| 3 | Corynebacterium glutamicum, M-901-No. 2347-TA52 (ATCC 21516).[2] | 49.2 | 32.8 |
| Control | Corynebacterium glutamicum, M-901-No. 2347 (ATCC 21253). | 43.3 | 28.9 |

[1] Penicillin-resisting mutant strain.
[2] Polymixin-resisting mutant strain.

NOTE.—A=Amount if produced L-lysine in broth; B=Yield on sugar.

Examples 4 and 5

Strains shown in Table 3 were cultured in a similar manner to that of Example 1 by using molasses A produced in Philippines (sugar—55.5%; ash—5.12%) and molasses B produced in Philippines (sugar—56.3%; ash—8.72%) as molasses material respectively to give the results shown in Table 3.

TABLE 3

| Example number | strain used | A | | B | |
|---|---|---|---|---|---|
| | | C | D | C | D |
| 4 | Corynebacterium glutamicum M-901-No. 2347-TA26 (ATCC 21514).[1] | 49.3 | 32.8 | 48.1 | 32.0 |
| 5 | Corynebacterium glutamicum M-901-No. 2347-TA52 (ATCC 21516).[2] | 47.8 | 31.8 | 45.6 | 30.4 |
| Control | Corynebacterium glutamicum M-901-No. 2347 (ATCC 21253). | 41.4 | 27.5 | 33.7 | 22.4 |

[1] Penicillin-resisting mutant strain.
[2] Polymixin-resisting mutant strain.

NOTE.—A=Molasses A; B=Molasses B; C=Amount of produced L-lysine (mg./ml.); D=Yield on sugar (percent).

Example 6

10 ml. of a medium having a composition of glucose (15 g./dl.), ammonium sulfate (4.0 g./dl.), $KH_2PO_4$ (0.1 g./dl.), magnesium sulfate (0.04 g./dl.), ferrous sulfate (0.001 g./dl.), manganese sulfate (0.6 mg./dl.), biotin (300 γ/l.), thiamine hydrochloride (200 γ/l.), Mieki (0.2 g./dl.), calcium carbonate (5 g./dl.), L-threonine (600 γ/ml.) and DL-methionine (200 γ/ml.) was placed in a 250 ml. Erlenmeyer flask and sterilized, to which 0.5 ml. of a seed culture of *Brevibacterium flavum* ST-12-$P_s$ 25 (ATCC 21518) which is penicillin-resisting mutant strain was inoculated. Cultivation was carried out at a temperature of 28° C. for 110 hours with shaking. The amount of L-lysine was 36.1 mg./ml. and the yield on sugar was 24.1%. (When the parent strain *Brevibacterium flavum* ST-12 (ATCC 21128) was used in a similar manner to that described above, 30.5 mg./ml. of L-lysine was obtained and the yield on sugar was 20.3%.)

What is claimed is:

1. A process for producing L-lysine by fermentation which comprises cultivating an L-lysine-producing mutant strain derived from a parent strain selected from the group consisting of *Corynebacterium glutamicum* and *Brevibacterium flavum* capable of resisting antibiotics in a nutrient medium, separating and recovering the accumulated L-lysine therefrom.

2. The process of claim 1 wherein the mutant strain is cultivated in the presence of an antibiotic selected from the group consisting of penicillin, bacitracin, cycloserine, gramicidin, polymixin, and nystatin.

3. The process of claim 1 wherein the mutant strain is selected from the group consisting of Corynebacterium strains having ATCC numbers 21513, 21514, 21515 and 21516 respectively.

4. The process of claim 1 wherein the mutant strain is selected from the group consisting of Brevibacterium strains having ATCC numbers 21517 and 21518 respectively.

5. The process of claim 1 wherein L-lysine is produced under aerobic cultivation conditions, a temperature of 24–37° C. and a pH of 5–8.5.

6. The process of claim 1 wherein the mutant strain is selected by cultivating in a screening medium containing 0.5–1000 γ/ml. of antibiotics.

References Cited

FOREIGN PATENTS 4,398   3/1966   Japan.

OTHER REFERENCES

Kutseva et al.: Chem. Abs., vol. 72, #11366m, 1970.

A. LOUIS MONACELL, Primary Examiner

G. M. NATH, Assistant Examiner

U.S. Cl. X.R.

195—47